L. Faris.
Animal Trap.
Nº 87,159. Patented Feb. 23, 1869.
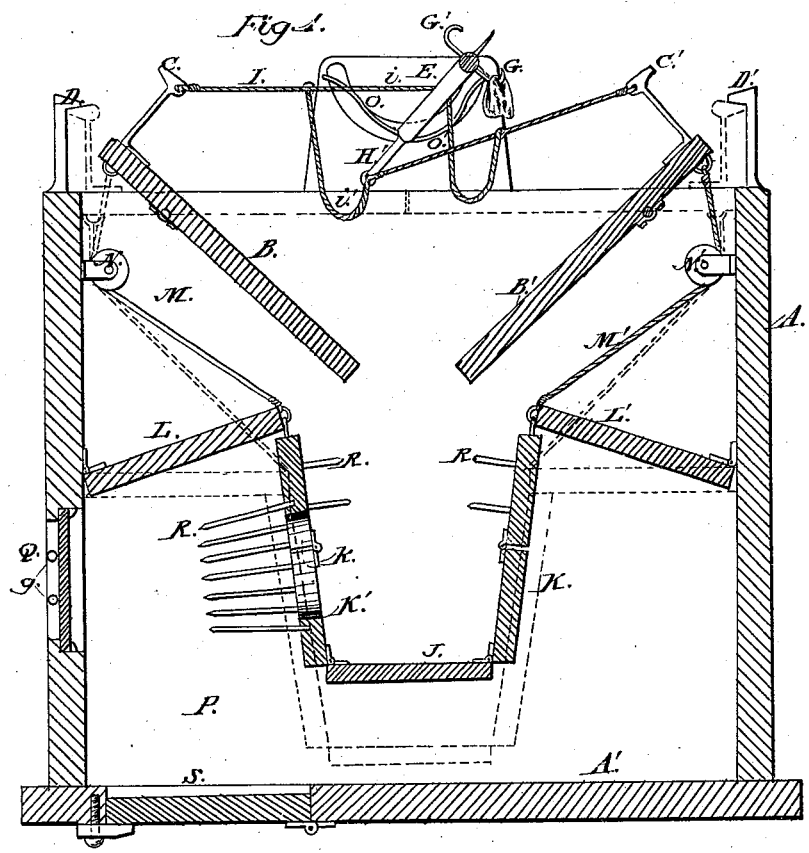
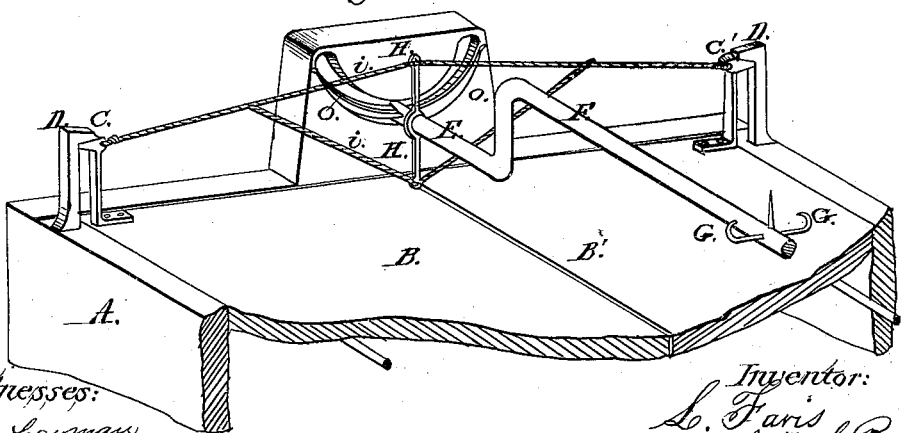

LAFAYETTE FARIS, OF PRINCETOWN, OHIO.

Letters Patent No. 87,159, dated February 23, 1869.

IMPROVED ANIMAL-TRAP.

The Schedule referred to in these Letters Patent and making part of the same.

*To whom it may concern:*

Be it known that I, LAFAYETTE FARIS, of Princetown, Highland county, Ohio, have invented a new and useful Animal-Trap; and I do hereby declare the following to be a full, true, and exact description thereof, reference being had to the accompanying drawings, making part of this specification.

This is an improvement in the class of animal-traps in which the weight of the entrapped animal is made effective to reset the trap for the next-comer.

Figure 1 is a vertical section of a trap embodying my invention.

Figure 2 is a perspective view, showing a portion of the top with the setting-device.

A represents a box or trunk, which may have a bottom, A', or may be open at bottom, when desired, to be set over a drowning-tank.

Hinged to the box, near the sides thereof, are two dead-falls or trap-doors, B B', which are held in their "set" or horizontal position (see fig. 2) by the engagement of trigger C in catch D, the said trigger rising from the door, slightly in rear of its hinge, and being made thin, and of spring-steel.

E is a rock-shaft, whose crank F is provided with bait-hooks G G', one or more on each side.

The said shaft is also provided with two wrists, one, H, above, and the other, H', below its axis of motion.

I is a chain, which, being attached to the trigger C, separates into two portions, *i i'*, which are respectively attached to the wrists H H' of the rock-shaft.

The platform J, for receiving the animal, is hinged to and depends from two boards, K K', which boards are themselves hinged to other boards L L', which boards are hinged to the box sides.

Cords or chains M M', extending from the free edges of the boards L L' around sheaves N N', to the heels or rear edges of the doors B B', enable the weight of the platform J and its attachments, together with that of the animal, to act, through the cords aforesaid, in depressing the heels of the doors, so as to restore them to the horizontal position, and to cause the re-engagement of the triggers C C', thus resetting the trap.

Springs O O', projecting from the rock-shaft E, serve to restore and hold it to its normal (or set) position, whenever released from the teeth of the animal.

Openings *k*, in the boards K K', permit of the animal entering a chamber, P, in the bottom of the box, which chamber may be lighted by a window, Q, protected by suitable gratings, *q*.

Suitable spurs or pointed rods, R, prevent the return of the animal, either from the chamber P to the platform J, or from the latter to the outside of the trap.

S is a door, through which to discharge the animals.

I claim herein as new, and of my invention—

The arrangement of the trap-doors B B', trigger C D, rock-shaft E F G G' H H', cords or chains I and M, platform J K K' L L', and springs O O', for the purpose set forth.

In testimony of which invention, I hereunto set my hand.

LAFAYETTE FARIS.

Witnesses:
 GEO. H. KNIGHT,
 JAMES H. LAYMAN.